United States Patent [19] | [11] 3,805,293
Weinberger et al. | [45] Apr. 16, 1974

[54] SIGNAL PROCESSING SYSTEM

[75] Inventors: Alan P. Weinberger; Harry L. Keller, both of Alexandria, Va.

[73] Assignee: The United States of America as represented by the Secretary of the Army, Washington, D.C.

[22] Filed: June 1, 1972

[21] Appl. No.: 258,690

[52] U.S. Cl. .................. 360/55, 340/15.5 A, 360/65
[51] Int. Cl. .... G11b 15/02, G11b 27/02, G01v 1/00
[58] Field of Search ........... 178/100.2 R, 100.2 MD, 178/100.2 K, 100.1 TD; 340/174.1 B, 15.5 A, 15.5 AP, 15.5 AC

[56] References Cited

UNITED STATES PATENTS

| | | | |
|---|---|---|---|
| 3,314,046 | 4/1967 | Brown | 179/100.2 MD |
| 3,311,874 | 3/1967 | Sheffield | 179/100.2 MD |
| 3,447,126 | 5/1969 | Reid | 179/100.2 K |
| 3,662,365 | 5/1972 | Rodriguez | 179/100.2 K |
| 3,283,295 | 11/1966 | Montgomery | 179/100.2 MD |
| 3,387,258 | 6/1968 | Goupillaud et al. | 179/100.2 MD |
| 3,403,232 | 9/1968 | Voyles et al. | 179/100.2 MD |

*Primary Examiner*—Bernard Konick
*Assistant Examiner*—Alfred H. Eddleman
*Attorney, Agent, or Firm*—Edward J. Kelly; Herbert Berl; Glenn S. Ovrelik

[57] ABSTRACT

A system for recording and processing signals such as seismic signals is disclosed. The signals are recorded on three channels in phase. The output of each channel has a gain of 30 db relative to the preceding channel. The processing circuitry has first, second and third stages that are connected to the first, second and third output channels of the recorder, respectively. First, second and third switches are also connected to the first, second and third output channels of the recorder. The three switches are connected to an output amplifier whose output is connected to a low pass filter. The second and third stages include logic circuitry that controls the three switches such that only one switch is closed at any given time. The particular switch closed at any given time depends upon whether or not the output signals from the second and third channels of the recorder saturate the logic circuitry of the second and third stages of the processing circuitry. If the third stage is saturated but the second stage is unsaturated, the second switch will be closed and the first and third switches will be open. If the second stage is saturated, the third stage will also be saturated and, therefore, the first switch will be closed and the second and third switches will be open. If the third stage is unsaturated, the third switch will be closed and the first and second switches will be open.

4 Claims, 1 Drawing Figure

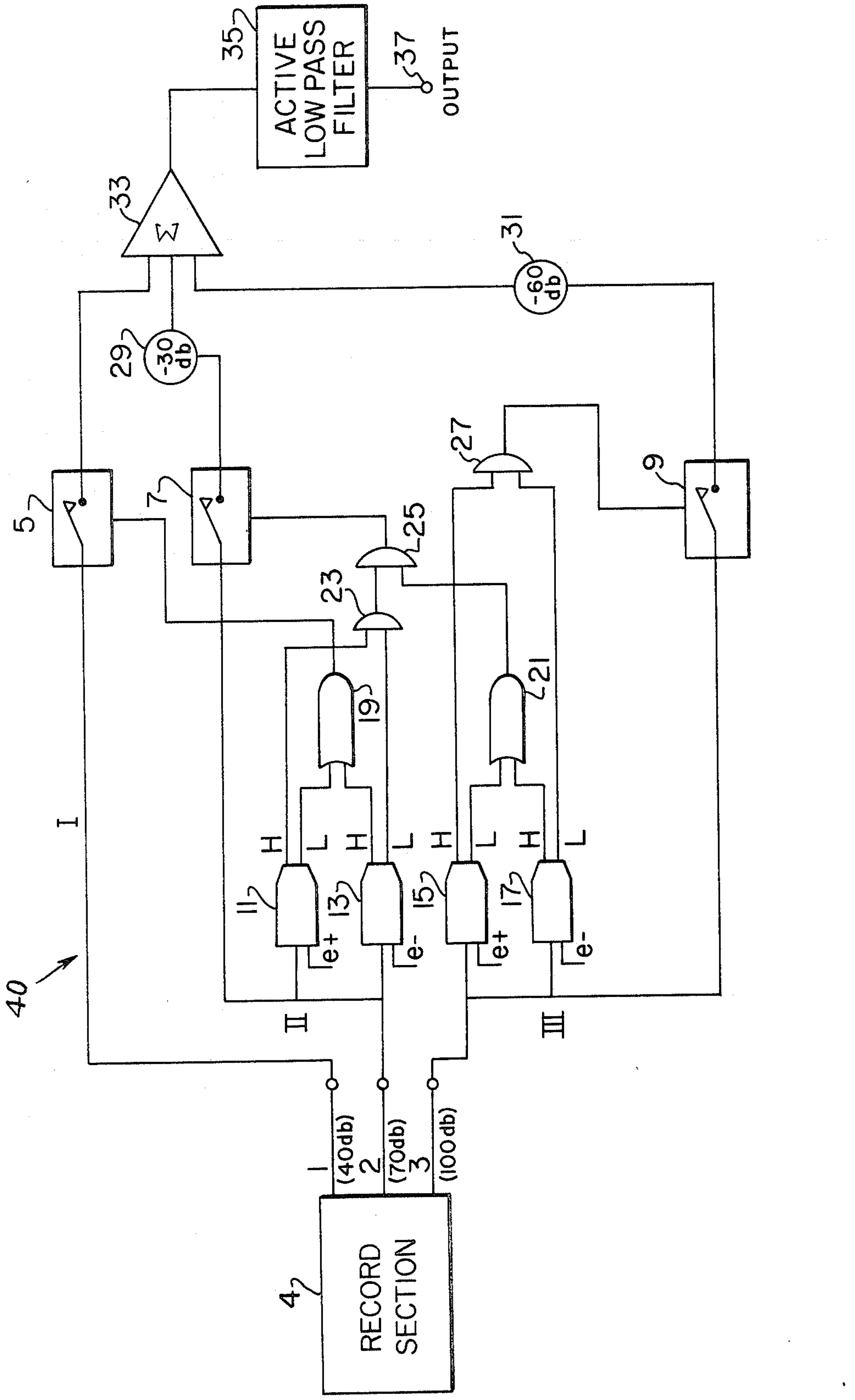
ACTIVE LOW PASS FILTER
OUTPUT
RECORD SECTION
(40db)
(70db)
(100db)
-30 db
-60 db
e+
e-
H
L
I
II
III

SIGNAL PROCESSING SYSTEM

The invention described herein may be manufactured, used, and licensed by or for the Government for Governmental purposes without the payment to us of any royalties thereon.

BACKGROUND OF THE INVENTION

This invention relates to signal processing circuitry; and more particularly, to circuitry for processing or analyzing signals which have a wide dynamic range, such as seismic signals.

The accurate analysis of seismic exploration signals is very difficult because of the wide dynamic range of the signals encountered, particularly where explosives are used in the seismic exploration. Many different systems have been devised to process these wide range signals. For example, compression circuitry has been used in the prior art to compress the signals into a useable range and digital circuitry capable of handling these wide dynamic range signals has also been used.

In the prior art systems, the seismic data is either processed in the field and then recorded for immediate or further analysis, or the signals are recorded with some minimum field processing. The recorded signals having a minimum processing are then further processed at the laboratory or plant for final analysis. The laboratory processing equipment can be and is in many instances very complex electronic circuitry. For that matter many of the prior art field systems where the data is recorded in final form in the field utilize rather complex electronic circuitry. This invention utilizes straight forward rather basic logic circuitry for processing signals having a wide dynamic range.

SUMMARY OF THE INVENTION

This invention provides circuitry for processing the output signals from a multidyne recording system that operates by recording a signal at three values of preamplifier gain. The processing circuitry is valuable in fields such as seismic data analysis where signals are encountered over a wide dynamic range. Seismic data amplitudes have been known to vary by 80 db or more.

The signals are tape recorded in the field on three recorder channels. The output of each recorder channel is then applied to a different one of three stages of the processing circuitry. This processing or playback circuitry selects the recorder channel whose instantaneous level is above the level of tape noise but below the level of saturation. The selected signal is switched to the final output of the processing or playback circuitry. The output of the processing circuitry can be again recorded for future analysis or can be applied to a meter or the like for immediate analysis.

The second and third stages of the processing circuitry contain logic circuitry that controls which recorder channel will be switched to the final output. Only one of the recorder channels is switched to the final output at any given time.

BRIEF DESCRIPTION OF THE DRAWING

A full and complete understanding of the invention can be obtained from the following detailed description when read in conjunction with the annexed drawing in which the single FIGURE shows a preferred embodiment of the invention.

DESCRIPTION OF THE INVENTION

Referring to the drawing, signals such as seismic signals are stored on three channels of a recorder such as a tape recorder which is part of the record section 4. The output signals from the first, second and third channels of the recorder appear on output terminals 1, 2 and 3, respectively. As indicated in the drawing the output of the first channel of the recorder has a gain of 40 db, the second channel a gain of 70 db and the third channel a gain of 100 db. Thus, each channel has 30 db gain relative to the preceding channel.

Record section 4 can be constructed of any suitable circuitry that will provide the proper three channel output signals. Such circuitry is well known in the art. For example, record section 4 may in addition to the three channel tape recorder comprise a low-noise preamplifier during two operational amplifiers each connected in a non-inverting configuration of gain +30 db. The preamplifier may be so designed that its gain can be manually varied from 20 to 60 db; the output of the preamplifier is the first channel output. The second channel output is then 30 db above the first channel output; and the third channel output is 60 db above the first channel output and 30 db above the second channel. Of course, as has been mentioned any other suitable circuitry can be used to fabricate record section 4.

If this invention is utilized to analyze seismic signals, record section 4 is taken to the field and the seismic signals are recorded on the three channel tape system. The signals are recorded on the tape system in phase with one another. After all the data desired has been recorded, record section 4 is brought back from the field and connected to the processing or playback section 40 of the invention. Processing section 40 processes the data stored in record section 4 so that a proper analysis of the information can be conducted.

As shown in the drawing, section 40 has the three stages I, II and III which are connected to output terminals 1, 2 and 3, respectively, of record section 4. As shown in the drawing, stage I contains only a switch 5. Switch 5 is preferably a FED switch but may be any other suitable switch including a high speed relay. The output from channel 1 of the record section is applied to one of the inputs of a summation amplifier 33.

Stage II of section 40 comprises a pair of operational amplifier comparators 11 and 13, and "OR" gate 19, a first "AND" gate 23, a second "AND" gate 25, a switch 7 which is identical to switch 5, and an attenuator 29. Switch 7 is connected between output terminal 2 and a second input of amplifier 33 through attenuator 29. Thus, the output signal from the second channel of record section 4 is applied to an input of amplifier 33 when switch 7 is closed. Output terminal 2 is also connected to one of two inputs of each of the operational-amplifier comparators 11 and 13. The second input of amplifier 11 is connected to the voltage source e+ while the second input of amplifier 13 is connected to voltage source e−. Amplifier comparators 11 and 13 each have two outputs. These outputs are labelled H and L in the drawing. The L output of amplifier comparator 11 is connected to one input of "OR" gate 19 and the H output of amplifier comparator 13 is connected to the second input of "OR" gate 19. The output of "OR" gate 19 is connected to switch 5. The H output of amplifier comparator 11 is connected to one of the two inputs of "AND" gate 23 and the L output of amplifier comparator 13 is connected to the second input of "AND" gate 23. The single output of "AND" gate 23 is connected to one of two inputs of "AND" gate 25. The single output of "AND" gate 25 is connected to switch 7.

Stage III of section 40 is similar to stage II and comprises a pair of operational-amplifier comparators 15 and 17 which are identical to amplifier comparators 11 and 13, an "OR" gate 21, an "AND" gate 27, a switch 9 which is identical to switches 5 and 7 and an attenuator 31. Switch 9 is connected between output terminal 3 of section 4 and the third input of amplifier 33 through attenuator 31. One input of amplifier 15 and one input of amplifier 17 are each connected directly to output terminal 3. The second input of amplifier 15 is connected to the voltage source e+ and the second input of amplifier 17 is connected to voltage source e−. As is the case with amplifier comparators 11 and 13, amplifier comparators 15 and 17 each have H and L outputs. The L output of amplifier comparator 15 is connected to one of two inputs of "OR" gate 21 and the H output of amplifier comparator 17 is connected to the second input of "OR" gate 21. The single output of "OR" gate 21 is connected to the second input of "AND" gate 25 of stage II. The H output of amplifier comparator 15 is connected to one of two inputs of "AND" gate 27 and the L output of amplifier comparator 17 is connected to the second input of "AND" gate 27. The single output of "AND" gate 27 is connected to switch 9.

Amplifier 33 has a single output which is connected to a low pass filter 35. The output of low pass filter 35 is connected to output terminal 37. Output terminal 37 may be connected to a recorder for storage and later study of the information or to a meter or other appropriate device for immediate analysis. Of course, the signals could be recorded while they are being analyzed for storage purposes and later further analysis. That is, a tape recorder can be connected to terminal 37 along with a meter or other equipment so that the signals can be analyzed and recorded at the same time.

Now that the circuitry of processing or playback section 40 has been described, the operation of this circuitry will be described. The basic function of processing seciton 40 is to select one, and one only at any given time, of the three outputs from record section 4 and transfer this output to the appropriate input of amplifier 33. However, no matter which output of record section 4 is switched to amplifier 33, the signal gain is to be a fixed value. In the FIGURE, the fixed gain is selected to be 40 db. Thus, stage I is a unity gain stage since the gain of the tape channel coupled to output terminal 1 is at 40 db. The gain of the signals at output terminals 2 and 3, however, are at 70 and 100 db, respectively. Attenuator 29 (−30 db) and attenuator 31 (−60 db) reduce the 70 and 100 db gain signals to the desired 40 db.

Processing or playback section 40 analyzes the three signals on outputs 1, 2 and 3 and selects the signal whose instantaneous level is above the level of tape noise but below the level of saturation of the operational-amplifier comparators 11 and 13 and 15 and 17. Operational-amplifier comparators 11 and 13 and 15 and 17 determine whether the sum of the signals and positive (e+) and negative (e−) reference voltage is greater than zero (H) or less than zero (L). If the sum of a signal and e+ is less than zero or the sum of the signal and e− is greater than zero, then that stage is approaching saturation. Thus, if stage II is approaching saturation either the output of amplifier comparator 11 or the output of amplifier comparator 13 will be zero. The output of the other amplifier comparator will have some value greater than zero. Thus, "OR" gate 19 will have an input signal voltage applied to only one of its inputs and will pass this signal to its output. The output signal voltage from "OR" gate 19 closes switch 5 and, therefore, the output signals from output terminal 1 of recorder section 4 is applied through switch 5 to the corresponding input of amplifier 33.

During this time switches 7 and 9 are open because no signal voltages are present on the output of "AND" gate 25 and the output of "AND" gate 27.

The fact that "AND" gate 25 does not have a signal voltage at its output should be apparent from the above description of the operation of "OR" gate 19. When stage II is saturated, a signal voltage will be present at only one of the inputs of "AND" gate 23. Therefore, no output signal voltage will be present on the output of "AND" gate 23 and no signal voltage will be applied to the input of "AND" gate 25 that is connected to the output of "AND" gate 23. Since no signal voltage is present at this input of "AND" gate 25, no signal voltage will pass through this gate to operate switch 7 even though a signal voltage is present on the input of "AND" gate 25 that is connected to the output of "OR" gate 21.

The reason that a signal is present at the output of "OR" gate 21 is because stage III is also saturated when stage II is saturated. Amplifier comparators 15 and 17 and "OR" gate 21 function the same as operational-amplifier comparators 11 and 13 and "OR" gate 19 of stage II. Similarly, "AND" gate 27 functions the same as "AND" gate 23 of stage II. Thus, when stage III is saturated, an input signal is present on only one of the inputs of "OR" gate 21 and "AND" gate 27. Under these conditions, the signal voltage will pass through to the output of "OR" gate 21 but will not pass through "AND" gate 27. Therefore, no signal voltage is present at the output of "AND" gate 27 to operate switch 9 and switch 9 will remain open. As was mentioned above, a signal voltage is present on the output of "OR" gate 21 but this signal has no effect because a signal voltage is not present on the other input of "AND" gate 25. While it should be apparent from the foregoing description, it is noted that switches 5, 7 and 9 are open and will close only when a signal voltage is applied to the switches from the circuitry of stages II and III. Thus, under the conditions described above (stages II and III saturated) only switch 5 is closed. Switches 7 and 9 remain open.

While stage III is saturated when stage II is saturated, stage II may not be saturated when stage III is saturated. If stage III is saturated and stage II is not saturated, switch 7 will be closed and switches 5 and 9 will be open. Recalling the operation of the circuitry as described above, if stage II is not saturated but stage III is saturated, no signal will be present on the output of "OR" gate 19 because signal voltages are present on both its inputs. A signal voltage will, however, be present on the output of "AND" gate 23 because signal voltages are present on both its inputs. A signal voltage is also present on the output of "OR" gate 21 because a signal voltage is present on only one of its inputs. Thus, a signal voltage is present on the output of "AND" gate 25 to close switch 7 because signal voltages are applied to both of its inputs. Switch 5 will remain open because no signal voltage is present on the output of " OR" gate 19 and switch 9 remains open because no signal voltage is present on the output of "AND" gate 27 since only one of its inputs carries a signal voltage when stage III is saturated. When switch 7 is closed the signals from output terminal 2 of record section 4 are applied to amplifier 33 through attenuator 29. Since the gain of signal at output terminal 2 is 70 db and the gain of attenuator 29 is −30 db, the signal at the input of amplifier 33 will have a gain of 40 db, the desired fixed value.

If stage III is not saturated, stage II will also not be saturated. Under these conditions, switch 9 will be closed because a signal voltage is present on the output of "AND" gate 27 since signal voltages are applied to both of its inputs. Switch 7 remains open because no signal voltage is present on the output of "AND" gate 25. No signal is applied to the input of "AND" gate 25 that is connected to the output of "OR" gate 21 since input signals are applied to both of its inputs. A signal voltage is applied to the input of "AND" gate 25 that is connected to the output of "AND" gate 23 because signals are present on both of the inputs of "AND" gate 23. However, since only one input of "AND" gate 25 has a signal applied thereto, no signal passes through this gate to operate switch 7. Similarly, switch 5 remains open because no signal voltage is present on the output of "OR" gate 19 since signals are present on both of its inputs.

When switch 9 is closed, the signals from output terminal 3 of record section 4 are applied to the third input of amplifier 33 through attenuator 31. Since the gain of the signals at output terminal 3 is 100 db and the gain of attenuator 31 is −60 db, the gain of the signals applied to amplifier 33 will be the desired 40 db.

From the foregoing description it should be apparent that only one of the output terminals of record section 4 is coupled through to amplifier 33 at any given time. It should also be apparent that processing or playback section 40 analyzes the signals present on all three output terminals of record section 4 and then select that output terminal having signals whose instantaneous level is above the noise level but below the level of saturation.

Separate unity gain buffer amplifiers may be provided in each stage between the switch of each stage and the corresponding input of amplifier 33. These unity gain buffer amplifiers are not absolutely necessary and are, therefore, not shown in the FIGURE, but would normally be utilized if impedance matching or isolation between the switches and amplifier inputs is required.

From the foregoing description it should be obvious that this invention provides a highly effective tool for analyzing data signals having a wide dynamic range such as seismic signals. The output signals from amplifier 33 are applied to low pass 35 filter and to output terminal 37. Meters or the like used to study and analyze these signals are connected to output terminal 37 and/or a recorder can be connected to the output terminal to store the signals for further or later analysis.

While the invention has been described with reference to a particular embodiment, it will be apparent to those skilled in the art that various changes and modifications can be made to the embodiment shown and described without departing from the spirit and scope of the invention as set forth in the claims.

What is claimed is:

1. A system for processing signals having a wide dynamic range comprising:

a signal source having first, second, and third output signal terminals from which input signals with respective gain levels are coupled, the gain of said input signals at said second output terminal being higher than the gain of the said input signals at said first output signal terminal and the gain of said input signals at said third output signal terminal being higher than the gain of said input signals at said second output signal terminal;

an output means, including a summation amplifier having first, second, and third input terminals and an active low pass filter in cascade connection with said summation amplifier;

first means for selectively coupling the first output terminal of said signal source to said first input terminal of said summation amplifier, said first means for selectively coupling including a first normally open switch, said first switch being operatively responsive to a discrete electrical signal;

second means for selectively coupling the second output terminal of said signal source to said second input terminal of said summation amplifier, said second means for selectively coupling including a second normally open switch and a first signal attenuation means in cascade connection, said second switch being operatively responsive to a discrete electrical signal;

third means for selectively coupling the third output terminal of said signal source to said third output terminal of said summation amplifier, said third means for selectively coupling including a third normally open switch and a second signal attenuation means in cascade connection, said third switch being operatively responsive to a discrete electrical signal;

first, second, third, and fourth operational amplifier comparators, each adapted to compare an input signal with a respective reference and each having first and second output terminals;

a first "OR" gate having two input terminals and one output terminal, means electrically connecting said two input terminals of said first "OR" gate to said second output terminal of said first operational amplifier comparator and to said first output terminal of said second operational amplifier comparator, respectively, said output terminal of said first "OR" gate being electrically connected to said first switch of said first means for selectively coupling and adapted to apply a discrete electrical signal to change the operational state of said first switch;

first and second "AND" gates, each having two input terminals and one output terminal, means electrically connecting said two input terminals of said first "AND" gate to said first output terminal said first operational amplifier comparator and to said second output terminal of said second operational amplifier comparator, respectively;

a second "OR" gate having two input terminals and one output terminal, means electrically connecting said two input terminals of said second "OR" gate to said second output terminal of said third operational amplifier comparator and to said first output terminal of said fourth operational amplifier comparator, respectively;

means electrically connecting said two input terminals of said second "AND" gate to said output terminal of said first "AND" gate and to said output terminal of said second "OR" gate, respectively, said output terminal of said second "AND" gate being electrically connected to said second switch of said second means for selectively coupling and adapted to apply a discrete electrical signal to change the operational state of said second switch;

a third "AND" gate having two input terminals and one output terminal, means electrically connecting said two input terminals of said third "AND" gate to said first output terminal of said third operational amplifier comparator and to said second output terminal of said fourth operational amplifier comparator, said output terminal of said third "AND" gate being electrically connected to said third switch of said third means for selectively coupling and adapted to apply a discrete electrical signal to change the operational state of said third switch;

said signal source and said first, second, third, and fourth operational amplifier comparators being adapted to close one of said first, second, and third switches, and one switch only, at any given time, the other two switches being open at that time.

2. A system as described in claim 1 wherein said signal source is a tape recorder having first, second and third channels, said input signals are stored in phase on each channel and said first, second and third output signal terminals of said signal source are coupled to said first, second and third channels, respectively.

3. A system as described in claim 2 wherein the gain of said input signals on said first output signal terminal is 40 db, said gain of said input signals on said second output signal terminal is 70 db and said gain of said input signals on said third output signal terminal is 100 db.

4. A system as described in claim 1 wherein said first attenuator attenuates said input signals from said second output signal terminal by 30 db and said second attenuator attenuates said input signals from said third output signal terminal by 60 db, whereby said input signals to said first, second and third output amplifier inputs all have a gain of 40 db.

* * * * *